United States Patent
Kumar

(10) Patent No.: US 7,831,276 B2
(45) Date of Patent: *Nov. 9, 2010

(54) PORTABLE COMPUTING, COMMUNICATION AND ENTERTAINMENT DEVICE WITH CENTRAL PROCESSOR CARRIED IN A DETACHABLE HANDSET

(75) Inventor: Rajendra Kumar, Akron, OH (US)

(73) Assignee: Khyber Technologies Corporation, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/539,373

(22) Filed: Oct. 6, 2006

(65) Prior Publication Data

US 2007/0142079 A1    Jun. 21, 2007

Related U.S. Application Data

(63) Continuation of application No. 11/305,996, filed on Dec. 19, 2005, now Pat. No. 7,120,462, which is a continuation of application No. 09/719,290, filed on Dec. 7, 2000, now abandoned.

(60) Provisional application No. 60/128,138, filed on Apr. 7, 1999.

(51) Int. Cl.
*H04M 1/00*    (2006.01)

(52) U.S. Cl. ............ 455/556.1; 455/556.2; 455/557; 455/566; 455/552.1; 455/88

(58) Field of Classification Search ............ 455/556.1, 455/556.2, 557, 566, 552.1, 88, 422.1
See application file for complete search history.

(56) References Cited

U.S. PATENT DOCUMENTS

| | | | |
|---|---|---|---|
| 5,189,632 A | | 2/1993 | Paajanen |
| 5,515,424 A | * | 5/1996 | Kenney ............ 379/93.22 |
| 5,530,852 A | | 6/1996 | Meske, Jr. et al. |
| 5,625,673 A | * | 4/1997 | Grewe et al. ............ 455/556.2 |
| 5,754,962 A | | 5/1998 | Griffin |
| 5,761,662 A | | 6/1998 | Dasan |
| 5,974,334 A | * | 10/1999 | Jones, Jr. ............ 455/556.2 |
| 6,069,593 A | * | 5/2000 | Lebby et al. ............ 455/557 |
| 6,115,618 A | | 9/2000 | Lebby et al. |
| 6,137,481 A | | 10/2000 | Phillipps |
| 6,266,539 B1 | * | 7/2001 | Pardo ............ 455/556.2 |
| 6,343,217 B1 | | 1/2002 | Borland |
| 7,120,462 B2 | | 10/2006 | Kumar |
| 2002/0068549 A1 | * | 6/2002 | Tendler ............ 455/414 |
| 2003/0114186 A1 | * | 6/2003 | Goetz ............ 455/552 |

FOREIGN PATENT DOCUMENTS

CN    1196840    10/1998

* cited by examiner

*Primary Examiner*—Joseph H Feild
*Assistant Examiner*—Huy D Nguyen
(74) *Attorney, Agent, or Firm*—Sand & Sebolt

(57) ABSTRACT

The present invention relates in general to portable processor based devices that provide computing, communication or entertainment functionality. More particularly, the present invention pertains to portable processor based devices operable while being held in its user's hand and providing communications, organizer and/or entertainment functions, such as cellular telephones, palm-sized organizers, and MP3 players, and to portable processor based devices providing general computing capabilities, such as laptop or handheld personal computers (PCs). More specifically, the present invention relates to systems that detachably mate a plurality of portable processor based devices to provide their combined functionality in an integrated structure.

18 Claims, 3 Drawing Sheets

PORTABLE COMPUTING, COMMUNICATION AND ENTERTAINMENT DEVICE WITH CENTRAL PROCESSOR CARRIED IN A DETACHABLE HANDSET

REFERENCE TO COPENDING APPLICATION

This application is a continuation of U.S. patent application Ser. No. 11/305,996 filed Dec. 19, 2005, hereby incorporated by reference, which is a continuation of U.S. patent application Ser. No. 09/719,290 filed Dec. 7, 2000, hereby incorporated by reference. This application also claims the benefit of PCT/US00/09188 filed Apr. 7, 2000 and U.S. Provisional Application Ser. No. 60/128,138 filed Apr. 7, 1999, hereby incorporated by reference.

TECHNICAL FIELD

The present invention relates in general to portable processor based devices that provide computing, communication or entertainment functionality. More particularly, the present invention pertains to portable processor based devices operable while being held in its user's hand and providing communications, organizer and/or entertainment functions, such as cellular telephones, palm-sized organizers, and MP3 players, and to portable processor based devices providing general computing capabilities, such as laptop or handheld personal computers (PCs). More specifically, the present invention relates to systems that detachably mate a plurality of portable processor based devices to provide their combined functionality in an integrated structure.

BACKGROUND ART

To address consumers' portable computing, mobile communications, and portable entertainment needs, a variety of portable devices have been developed. The distinctly differing requirements of each application has made it too costly and unwieldy for such devices to fulfil more than one type, or two closely related types of need.

For example, smart cell phones are devices that combine the capabilities of cell phones and electronic organizers. Typical of such devices are the Model PDQ-800 from Qualcomm, Incorporated of San Diego, Calif., and the Model R380 from Ericsson, Incorporated of Richardson, Tex. These products perform quite well as handheld computing and communication devices by allowing the user to access the Internet for email, stock quote, etc., while preserving their use as simple wireless phone units. However, in order to allow handheld grasping these units had to be kept small, thereby limiting their display to a size that is too small for practical use in conventional computing such as Web browsing, word processing, etc. Also, to keep the cost of such devices low, their designers employed central processors that have just enough power to carry out smart phone functions, and not enough power to handle general computing requirements.

Recently Motorola, Inc. of Schaumburg, Ill. has begun to sell its clipOn Organizer as an attachment to its StarTAC cellular telephone and provide it with smart phone functionality. The clipOn Organizer and StarTAC phone have been designed to operate as individual, standalone units that each furnish its own processor and power supply. Consequently, attaching the units does not achieve the reduced size or cost desired in an integrated combination.

For portable computing, the industry provides conventional laptop computers, such as those based on Pentium processors from Intel Corporation of Santa Clara, Calif. and Windows software from Microsoft Corporation of Redmond, Wash., and mini-laptop computers, such as Microsoft WindowsCE based devices, called Handheld Personal Computers (HPCs). The industry has also furnished palm-sized devices for personal information management and organization such as the Palm Pilot from 3Com Corporation of Santa Clara, Calif., and Microsoft WindowsCE-based palm-sized PCs.

To fulfill the portable entertainment needs of consumers, the computer industry provides digital audio players, such as the Diamond Multimedia Rio model made by S3, Inc. of Santa Clara, Calif. that plays MP3 compatible audio content down-loaded from the Internet. Another portable entertainment device is the wireless system controller for home entertainment systems provided by Harmon/Kardon International of Woodbury, N.Y.

To fulfil both mobile computing and communications needs, a mobile worker has to carry two, and sometimes three devices—a smart phone unit, an organizer, and a laptop unit. Of course, if entertainment is also desired, the user must carry yet another device—the MP3 player. The user has to purchase and maintain multiple units—charging multiple sets of batteries and synchronizing data from one with that of the other. Consequently, there is a need for a device that provides a complete solution for mobile computing, communication and entertainment without having to own and maintain multiple units.

SUMMARY OF THE INVENTION

It is, therefore, an object of the present invention to provide a portable processor based device for mobile computing, communication and entertainment without having to acquire and maintain multiple units. Such device works in much the same way as conventional laptop computers. However, in the current invention, the central processor, communication circuit, speaker, microphone, and power supply are carried in a detachable handset. The detachable handset unit functions as a wireless phone unit. Also, by having its own display and keypad it can serve as an Internet appliance for email access and for downloading of information from the Internet, such as electronic books, audio books, digital music, etc.

For applications requiring larger display and keyboard, the detachable handset unit is docked into the main unit, the docking display unit. In this mode the detachable handset unit provides the processing and the communication power to the docking display unit. The combined unit is suitable for conventional computing such as Web word processing, and spreadsheet applications. The combined unit can also be used for reading downloaded electronic books.

The detachable handset unit has additional functions. It can be used as a portable digital audio player in one of two ways. First, by plugging a headphone into its jack, the user can listen to downloaded music or audio books. Second, by docking into the docking display unit, that contains larger speakers, the downloaded music or other content can be played back in much the same way as done by a standard PC or a laptop computer. The detachable handset can be equipped with appointment manager software, thereby functioning as a clock radio by itself or while docked with the docking display unit.

The detachable handset can be equipped with infrared transceiver for providing wireless optical communication with other compatible units such as those compatible with IrDA standard. With suitable software the detachable handset unit can be made to function as a remote control unit for TV, VCR and other home entertainment systems and appliances.

The user can pre-enter the desired program schedule once and thereafter have the detachable handset select the channels automatically.

The docking display can be mounted in a vehicle, further extending the function of the mobile computing and communication device. The detachable handset may be fitted with a Global Positioning Satellite System (GPS) capability. In that case when the detachable unit is docked in the docking display, the combined unit serves as an auto PC, giving the vehicle driver the location of the vehicle on a map on the large display in much the same way as AutoPC reference design from Microsoft, with the exception that in the current case the detachable unit is usable in a plurality of applications.

These and other objects and advantages of the present invention over existing prior art forms will become more apparent and fully understood from the following description in conjunction with the accompanying drawings.

In general, a portable computing, communication and entertainment device in accordance with the present invention includes a detachable handset unit and a portable docking display unit. The detachable handset unit is sized for handheld grasping and includes a processor and a plurality of first circuits, the processor controlling the operation of the first circuits. The portable docking display unit is dimensioned to receive docking of the detachable handset unit and includes a first display and a plurality of second circuits. The processor controls the operation of at least one of the second circuits and the first display when the detachable handset unit is docked with the docking display unit.

PREFERRED EMBODIMENT FOR CARRYING OUT THE INVENTION

One embodiment of an exemplary device in accordance with the present invention for mobile computing, communication and entertainment, is illustrated in FIGS. 1 through 4 and generally indicated by the numeral 10. Device 10 includes a detachable handset unit 20 and a docking display unit 30.

Figure 3:
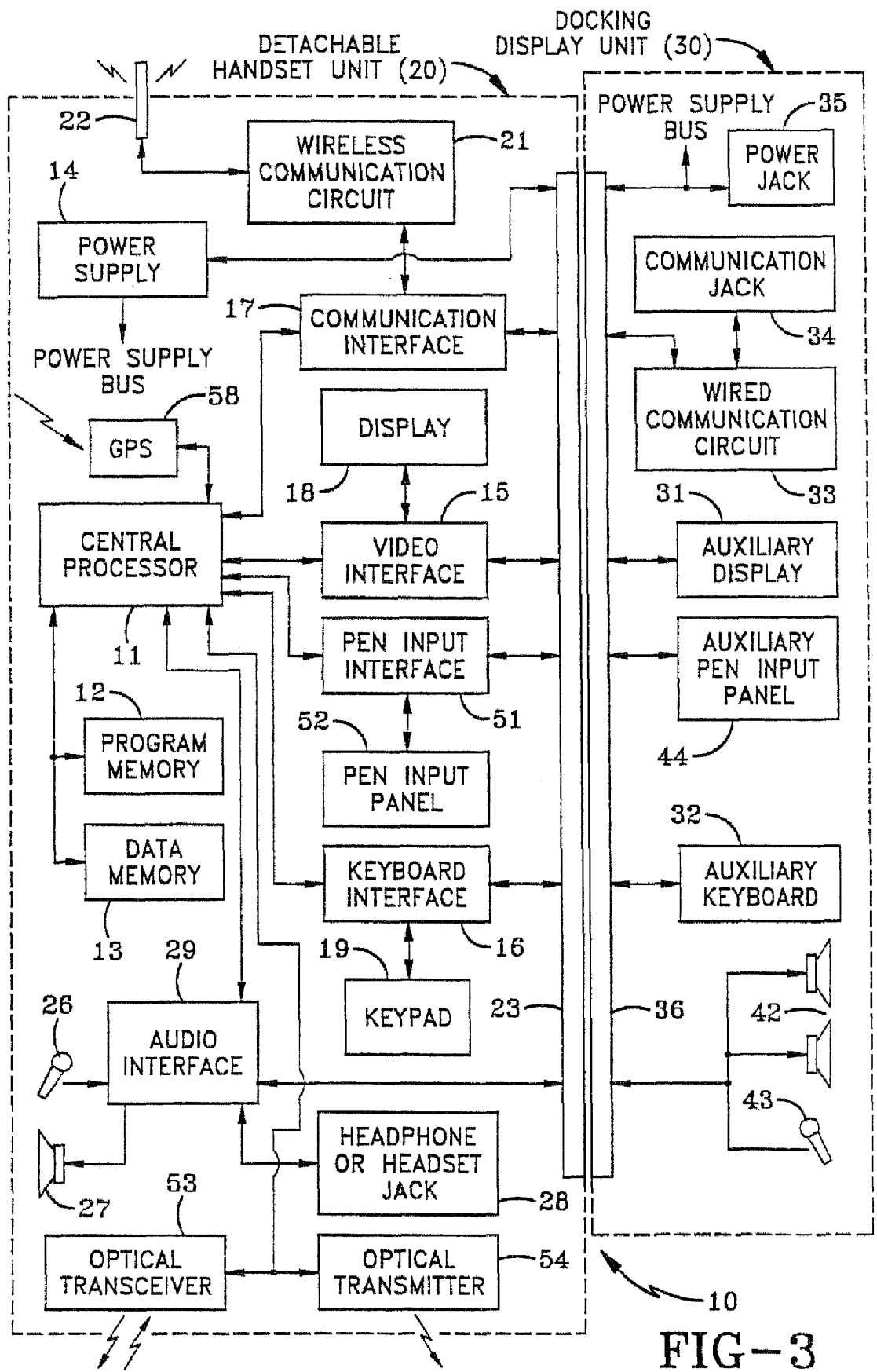
FIG. 3 is an exemplary block diagram of the device shown in FIG. 1.

Detachable handset unit 20 may also include an electrical connector 23 that carries signals from the central processor 11 through video interface 15, keyboard interface 16, communication interface 17, pen-input interface 51, audio interface 29, and power supply 14. As seen in FIG. 3, the docking display unit 30 does not include a central processor, and one or more of the circuits of the docking display are operated by the central processor 11 of the detachable handset unit. Mating electrical connector 36 in docking display unit 30 may therefore connect these signals to auxiliary display 31, auxiliary keyboard 32, wired communication circuit 33, auxiliary pen-input panel 44, speakers 42 and microphone 43, and power-jack 35. Communication circuit 33 is connected to communication jack 34 for further connection to communication lines such as the public switched telephone network or cell or other wireless network.

Docking display unit 30 includes a recessed platform 38, with an electrical connector 36, a fixed tab 39 and a movable tab 41, retractable by latch 37. To dock detachable handset unit 20 into docking display unit 30, fixed tab 39 is slid into slot 24 with the front side of detachable handset unit 20 facing platform 38. The other end of detachable handset unit 20 is brought down to have connector 23 on detachable handset unit 20 mate with connector 36 of docking display unit 30. Tab 41 is slid into slot 25 to secure detachable handset unit 20 in place.

Docking display unit 30 is shown as a clamshell style unit, including an auxiliary display 31, in the lid portion and an auxiliary keyboard 32 in the base portion, facing each other in the closed position. The lid of docking display unit 30 also contains a communication jack 34, such as a standard RJ-style telephone jack, and a power jack 35, such as an AC adapter/charger jack.

The block diagram in FIG. 3 shows detachable handset unit 20 including a central processor 11, and the circuits supported and/or controlled by it, namely program memory 12, at memory 13, power supply 14, video interface 15, keyboard interface 16, communication interface 17, pen-input interface 51, and audio interface 29. In turn, video interface 15 drives display 18, the keyboard interface 16 drives the keypad 19, communication interface 17 drives wireless communication circuit 21, pen-input interface 51 drives the pen-input panel 52, and audio interface 29 drives microphone 26 and speaker 27, and connects to the headphone jack 28. Wireless communication circuit 21 is connected to the antenna 22. GPS receiver 58, such as that supplied by SiRF Technology of San Jose, Calif., is also connected to central processor 11.

Detachable handset unit 20 also includes an electrical connector 23 that carries signals from the central processor 11 through video interface 15, keyboard interface 16, communication interface 17, pen-input interface 51, audio interface 29, and power supply 14. Mating electrical connector 36 in docking display unit 30 connects these signals to auxiliary display 31, auxiliary keyboard 32, wired communication circuit 33, auxiliary pen-input panel 44, speakers 42 and microphone 43, and power-jack 35. Wired communication circuit 33 is connected to communication jack 34 for further connection to external wired communication lines such as the public switched telephone network.

Detachable handset unit 20 may also contain an optical transmitter 54 for transmission of remote control signals to TV, VCR, etc. Alternately, it may be equipped with an optical transceiver 53 for optical communication with other compatible devices such as laptop computers, printers and network interfaces.

In another variation of the above embodiment the interface signals connecting the circuitry carried in detachable handset unit 20 and docking display unit 30 may be multiplexed, using conventional multiplexing circuits, in order to reduce the number of interconnect signals and hence reducing the size of connectors 23 and 36.

In another variation of the above embodiment, detachable handset unit 20 may contain no display at all, like conventional cordless handsets. In this case central processor 11 will still drive the auxiliary display 31 through the video interface 15, and video interface 15 may be housed in docking display unit 30, further reducing the size of detachable handset unit 20.

Figure 1:
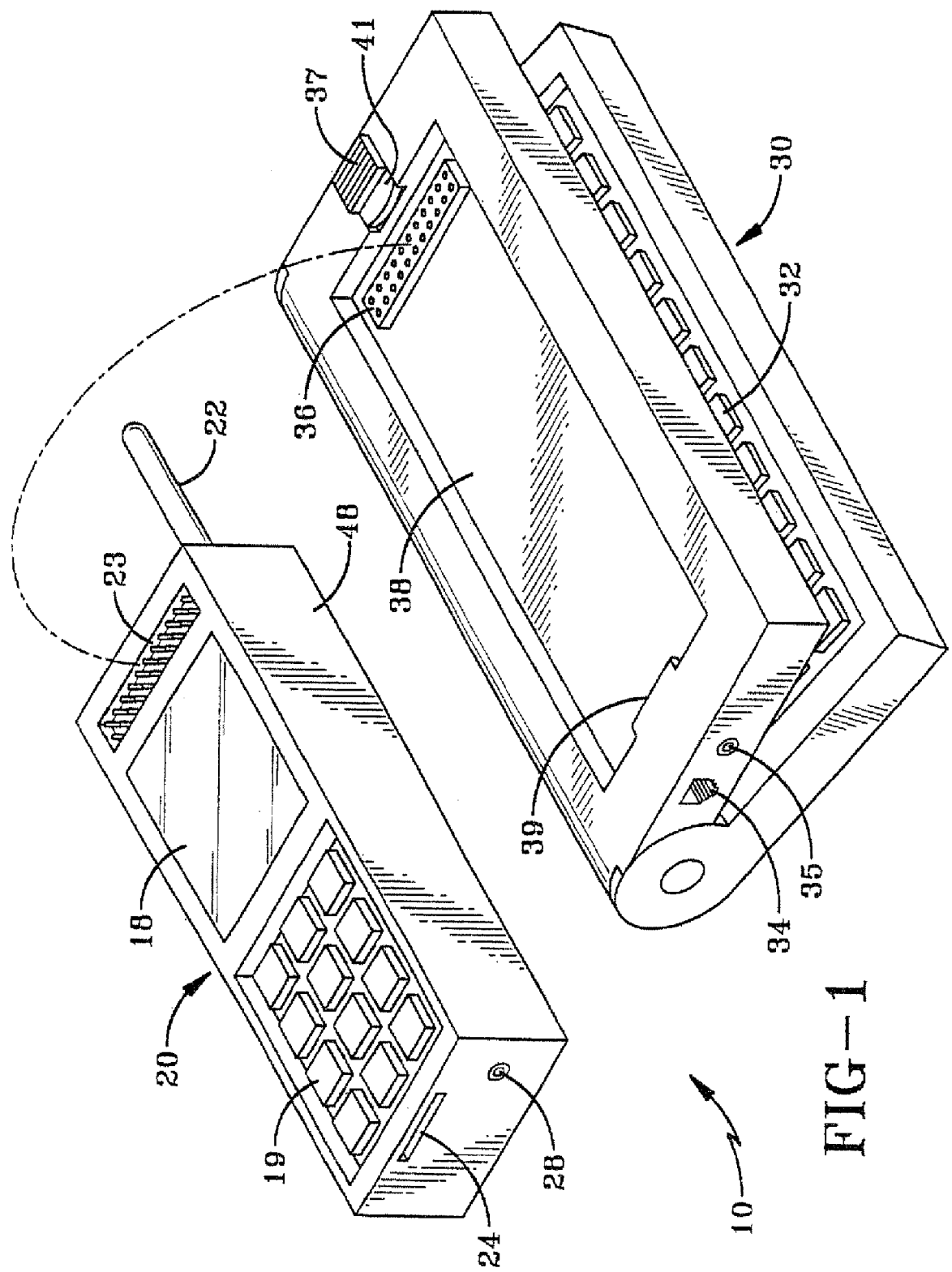
FIG. 1 is a perspective view of an exemplary device in accordance with the present invention for mobile computing, communication and entertainment. This view presents a front perspective view of a detachable handset unit and a top perspective view of a clamshell shaped docking display unit having a partially open lid and base, and illustrates diagrammatically how exemplary electrical connectors in each unit may engage and mate so that the units form a single combined device.
Figure 2:
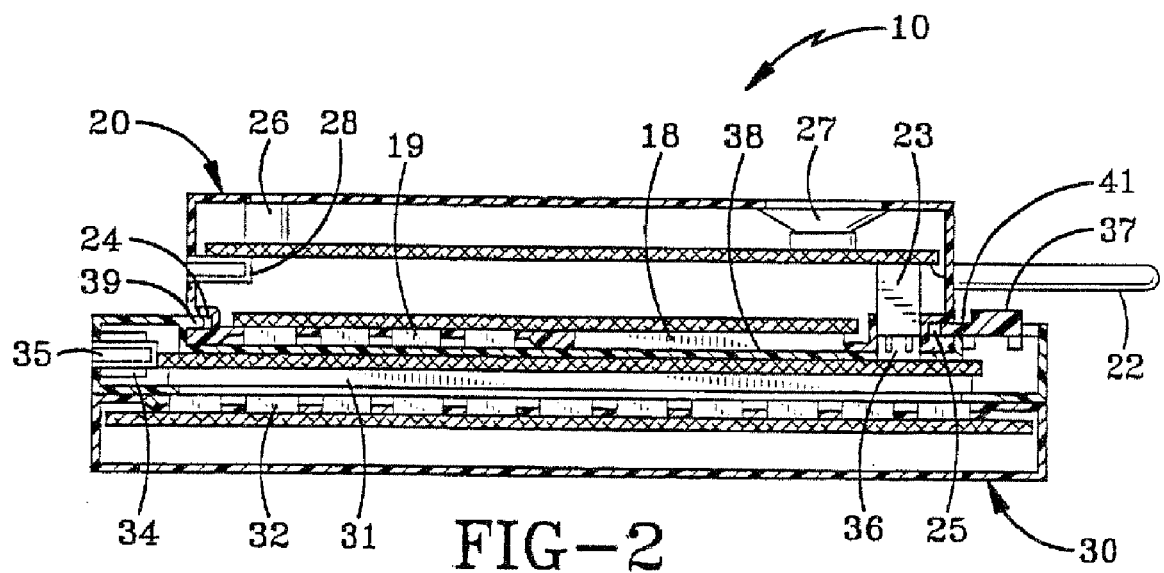
FIG. 2 is a cross section elevational view of the exemplary device shown in FIG. 1 with the detachable handset unit mated with the docking display unit.
Figure 4:
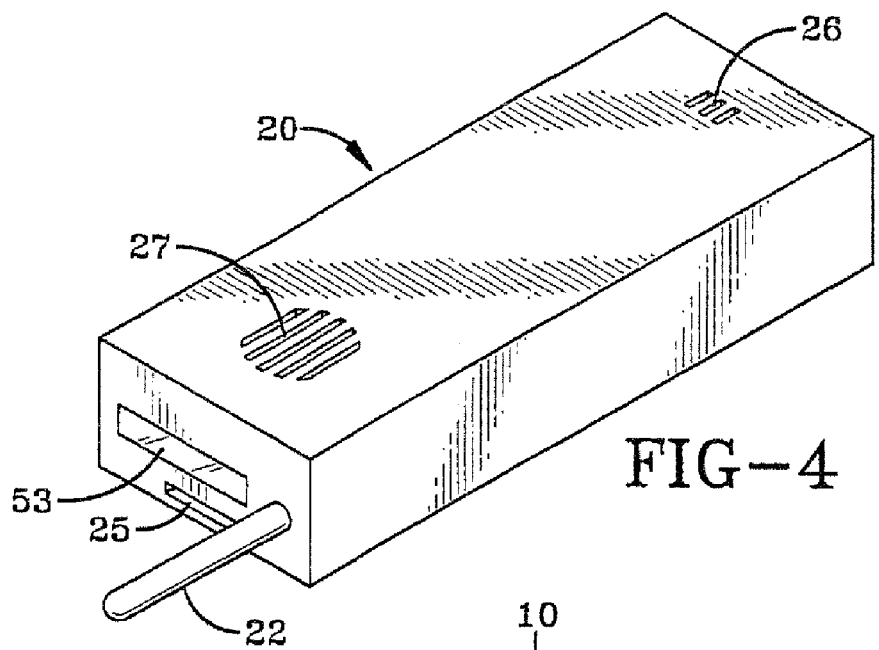
FIG. 4 is a rear perspective view of the detachable handset unit.
Figure 5:
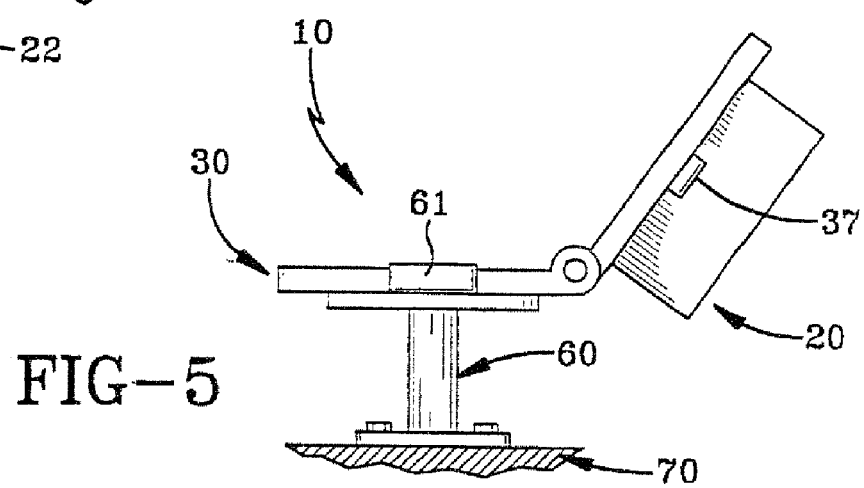
FIG. 5 is a side elevational view of the device shown in FIG. 1 when mounted in a vehicle and in an operational configuration.

FIG. 5 shows docking display unit 30 mounted on the floor of a vehicle 70. The bottom end of a pedestal 60 is attached to the vehicle floor 70. Clamps 61 are attached to the top end of pedestal 60. Docking display unit 30 can be removably mounted on pedestal 60 by sliding into clamps 61. Alternately, docking display unit 30 may be fixed-mounted on pedestal 60 using bolts or other conventional methods. Detachable handset unit 20 can then be docked in docking display unit 30 in the same manner as in the other applications described hereinbefore.

The ordinarily skilled artisan should now appreciate that in this way a portable device for computing, communication and/or entertainment device, can be created that has a detachable handset unit. When mated with a docking display unit, the detachable handset unit becomes the controller for the entire portable computing, communication and entertainment device. The detachable handset unit is in a smaller housing that is dimensioned for handheld grasping, and is sized to be carried in a pocket like an average cell phone. The docking display unit carries an auxiliary, larger display and other components. The central processor, carried in the detachable handset unit, and being used to operate the docking display unit, must have enough processing power to adequately perform functions of an entire portable computing, communication and entertainment device, and not just the functions of a wireless phone. Examples of commercially available processors adequate for this task include the Intel StrongARM processor, the models SH-3 and SH-4 processors from Hitachi American, Ltd. of Brisbane, Calif., and the model 4100 RISC processor from NEC America, Inc. of Irving, Calif.

As technology advances in the future, the Pentium processor from Intel, used in most laptop computers, may be used in other embodiments of the current invention. The other components used in device 10 can be similar to those employed by traditional computing devices, communication devices and entertainment devices. Typical of these other components are: liquid crystal displays of small and large sizes from Optrex America Inc. of Detroit, Mich., and Seiko Instruments USA, Incorporated of Torrance, Calif.; memory chips from Micron Technologies, Inc. of Boise, Id., VLSI Technologies wireless communication chips available from Philips North America in Atlanta, Ga., power supply chips from Analog Devices Inc. of Norwood, Mass., and pen-input panels from MicroTouch Systems, Inc. of Methuen, Mass.

Device 10 as described hereinbefore will require operating system software such as Microsoft Windows or WindowsCE. Off-the-shelf application software such as Microsoft Outlook, PocketWord, etc. can be used for various tasks. Alternately, the Java software platform from Sun Microsystems, Inc. of Palo Alto, Calif., can be implemented in device 10. In this instance, Java applets can be downloaded into device 10 from the Internet via wireless communication circuit 21 or via wired communication circuit 33.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of devices for mobile computing, communication and entertainment.

What is claimed is:

1. A portable processing device comprising:
a detachable portable unit sized for handheld grasping and including a central processor and a plurality of first circuits, said processor controlling the operation of said first circuits, and said first circuits including at least a video interface, a communication interface and a data input interface;
a portable docking display unit dimensioned substantially larger than said detachable portable unit, said docking display unit including a first display and a plurality of second circuits, said plurality of second circuits not including a central processor and including a video interface, and a data input interface, and wherein said central processor controls the operation of at least one of said second circuits and said first display when said detachable portable unit is docked with said docking display unit;
and the docking display unit is fully operable only when the detachable portable unit is docked thereto.

2. A device, as set forth in claim 1, wherein control signals from the central processor are coupled by means of a first electrical connector provided on the detachable portable unit and said docking display unit further includes a second electrical connector for removably engaging said first electrical connector when said detachable portable unit and said docking display unit are docked.

3. A device, as set forth in claim 1, wherein said detachable portable unit further includes at least one of a memory, a wireless communication circuit, a first microphone, a first speaker, and a power supply.

4. A device, as set forth in claim 1, wherein detachable portable unit includes a first speaker and microphone and said docking display unit further includes a second speaker and a second microphone.

5. A device, as set forth in claim 1, wherein said docking display unit includes a first pen-input panel and said detachable portable unit includes a second pen-input panel.

6. A device, as set forth in claim 1, wherein said docking display unit is mounted in a vehicle.

7. A device, as set forth in claim 1, wherein said detachable portable unit includes a first keyboard and said docking display unit includes a second keyboard.

8. A device, as set forth in claim 1, wherein said detachable portable unit includes a connection for an external headphone.

9. A device, as set forth in claim 1, wherein said detachable portable unit includes at least one of an optical transmitter and an optical transceiver.

10. A portable processing device comprising:
a detachable portable unit sized for handheld grasping and including an application processor and a plurality of first circuits, said processor controlling the operation of said first circuits, and said first circuits including at least a video interface, a communication interface and a data input interface;
a portable docking display unit dimensioned substantially larger than said detachable portable unit, said docking display unit including a first display and a plurality of second circuits, said plurality of second circuits not including an application processor and including a video interface, and a data input interface, and wherein said application processor controls the operation of at least one of said second circuits and said first display when said detachable portable unit is docked with said docking display unit;

and the docking display unit is fully operable only when the detachable portable unit is docked thereto.

11. A device, as set forth in claim 10, wherein control signals from the application processor are coupled by means of a first electrical connector provided on the detachable portable unit and said docking display unit further includes a second electrical connector for removably engaging said first electrical connector when said detachable portable unit and said docking display unit are docked.

12. A device, as set forth in claim 10, wherein said detachable portable unit further includes at least one of a memory, a wireless communication circuit, a first microphone, a first speaker, and a power supply.

13. A device, as set forth in claim 10, wherein detachable portable unit includes a first speaker and microphone and said docking display unit further includes a second speaker and a second microphone.

14. A device, as set forth in claim 10, wherein said docking display unit includes a first pen-input panel and said detachable portable unit includes a second pen-input panel.

15. A device, as set forth in claim 10, wherein said docking display unit is mounted in a vehicle.

16. A device, as set forth in claim 10, wherein said detachable portable unit includes a first keyboard and said docking display unit includes a second keyboard.

17. A device, as set forth in claim 10, wherein said detachable portable unit includes a connection for an external headphone.

18. A device, as set forth in claim 10, wherein said detachable portable unit includes at least one of an optical transmitter and an optical transceiver.

* * * * *